SQUARE WAVE GENERATOR AND DIODE MODULATOR

Filed May 14, 1958

INVENTOR.
JACK D. WELCH
BY Marvin Moody
ATTORNEY 2,947,883

SQUARE WAVE GENERATOR AND DIODE MODULATOR

Jack D. Welch, Cedar Rapids, Iowa, assignor to Collins Radio Company, Cedar Rapids, Iowa, a corporation of Iowa Filed May 14, 1958, Ser. No. 735,153

1 Claim. (Cl. 307—88.5)

This invention relates in general to square wave generators, and in particular to a novel square wave generator using diodes.

It is often desirable to convert a direct current signal to an alternating current signal so that it may be more easily handled.

It is an object of this invention to provide a square wave generator capable of converting a direct current input signal to an output square wave with an amplitude proportional to the input direct current.

A feature of this invention is found in the provision for a transformer with its primary in parallel with a pair of zenar diodes and its secondary connected in parallel to a plurality of silicon diodes, some of which are connected to a direct current signal.

Figure 1:
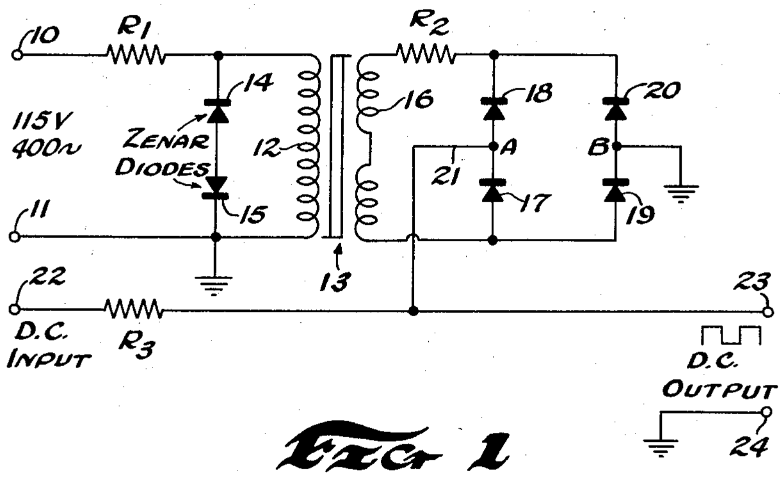
Figure 2:
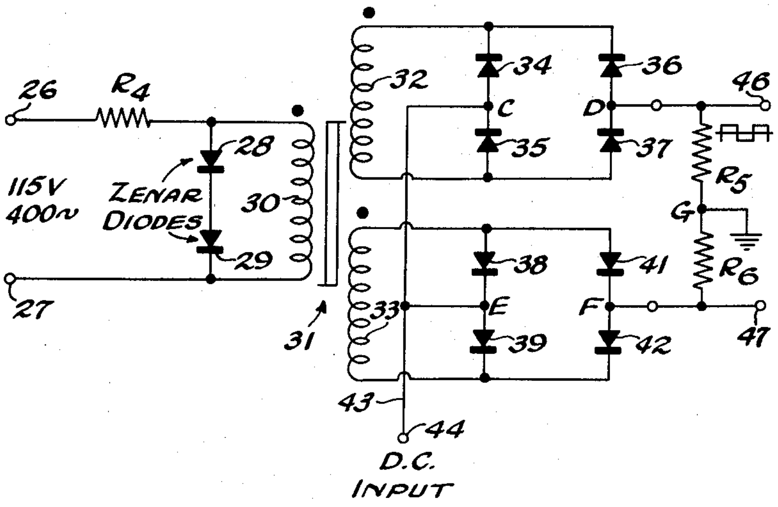

Further features, objects and advantages of this invention will become apparent when the following description is read in view of the accompanying drawings, in which Figure 1 is a half-wave square generator, and Figure 2 is a full-wave square wave generator.

Figure 1 illustrates a pair of input terminals 10 and 11 to which may be connected a suitable alternating power supply, as for example, 115 volts, 400 cycles. A current limiting resistor $R_1$ is connected in series with the input terminal 10 and a primary 12 of transformer 13. The other side of primary 12 is connected to the input terminal 11.

A pair of zenar diodes 14 and 15 are connected back to back in parallel with the primary 12. The forward impedance of a zenar diode is very low, but the reverse impedance is such that a voltage of about 7.5 volts will cause current to flow in the reverse direction. Thus, the voltage across the primary 12 will never go above seven and one-half volts due to the zenar diodes 14 and 15.

A core formed of essentially square hysteresis material couples the primary to the secondary. In a model built, adequate turns of wire were used on the transformer primary to absorb ten volts at four hundred cycles per second from the supply. Since the zenar diodes used clamped the primary voltage at approximately eight volts, this insured that the core material would never reach saturation. Since the unit was designed to operate from a 115-volt supply, the primary voltage as seen by the transformer consists of essentially a square wave.

Now since the primary voltage is essentially a square wave, and since, in the square hysteresis loop core material used for the transformer core, the flux change per unit time is constant prior to saturation if the voltage impressed across the coil is constant, a square wave of voltage will be induced in the isolated secondary of the transformer.

The secondary 16 of the transformer 13 is connected in series with a resistor $R_2$. A pair of diodes 17 and 18 are connected across the secondary 16. A second pair of diodes 19 and 20 are connected in parallel with diodes 17 and 18. The junction point between diodes 19 and 20 is connected to ground and an input lead 21 is connected to the junction point between the diodes 17 and 18.

An input terminal 22 is connected in series with a resistor $R_3$ which has its other side connected to lead 21. An output terminal 23 is also connected to the lead 21. A second output terminal 24 is connected to ground.

The diodes 17, 18, 19, and 20 may be silicon diodes, as for example Hughes Type HD 6006 which have a relatively high backward impedance. The secondary 16 is wound so that the voltage across the secondary winding 16 and the resistor $R_2$ never exceeds one volt.

In operation the incoming 115-volt, 400-cycle voltage will be clipped at a 7.5 voltage level due to zenar diodes 14 and 15 and thus the voltage at the primary 12 will never go above seven and one-half volts.

Since the primary voltage is essentially a square wave due to the clipping action of the diodes 14 and 15, and since core material is used which produces a flux change per unit time that is constant prior to saturation, a square wave voltage will be induced in the secondary 16 of the transformer which causes the diodes 17—20 to operate in a switching mode. With a commutating voltage of one polarity, all four diodes will have an extremely low impedance which will effectively place the points A and B between the diodes 17 and 18, and 19 and 20, respectively, at the same potential which is ground since point B is directly connected to ground. However, when the commutating voltage reverses polarity all four diodes have a high impedance and the junction point A between diodes 17 and 18 will be several megohms above point B. This results in the direct current applied to terminal 22 being alternately shorted to ground due to the commutating action. Thus, the lead 21 is alternately shorted to ground and open, which produces a square wave output between terminals 23 and 24, with the amplitude of the square wave varying with the direct current input. The direct current input might be a signal from a gyroscope pick-off, for example, which is to be converted to a pulsating direct current.

Figure 2 illustrates a full wave circuit wherein a pair of input terminals 26 and 27 might be connected to a 115-volt, 400-cycle power supply. A resistor $R_4$ is connected in series with a pair of zenar diodes 28 and 29 which are connected back to back across primary 30 of transformer 31. Input terminal 27 is connected to one side of primary 30 and the other side of primary 30 is coupled to terminal 26 through resistor $R_4$.

A pair of secondaries 32 and 33 are coupled to the primary 30. Diodes 34 and 35 are connected in series across the secondary 32. Diodes 36 and 37 are connected in series across secondary 32 and are in parallel with the diodes 34 and 35.

The secondary 33 has a pair of diodes 38 and 39 connected in series across it. Another pair of diodes 41 and 42 are connected in series and are in parallel with diodes 38 and 39. An input lead 43 is connected to an input terminal 44. A direct current input may be supplied to terminal 44. Lead 43 is connected to junction points C and E between diodes 34 and 35 and 38 and 39, respectively. An output terminal 46 is connected to the junction point D between diodes 36 and 37 and an output terminal 47 is connected to the junction point F between diodes 41 and 42. A pair of resistors $R_5$ and $R_6$ are connected across the output terminals 46 and 47. The junction point G between resistors $R_5$ and $R_6$ is connected to ground.

In operation, as the commutating voltage applying to terminals 26 and 27 reverses polarity it causes the impedance between the junction points C and D to alternately become zero and a high impedance. On the alternate half cycle the impedance between E and F will become zero, and on the next half cycle will be a high impedance. Thus, when C and D are at the same impedance E and F will be separated by a high impedance, and when E and F are at the same impedance a high impedance will exist between points C and D. This results in the output at terminals 46 and 47 being a square wave centered about ground potential and with the positive and negative amplitudes being proportional to the input direct current signal at terminal 44.

It is seen that this invention provides a simple commutating circuit that allows a direct current signal to be converted to a square wave wherein the amplitude of the signal is proportional to the direct current input.

Although it has been described with respect to preferred embodiments, it is not to be so limited, as changes and modifications may be made therein which are within the full intended scope of the invention as defined by the appended claim.

What is claimed is:

A square wave generator for converting a direct current signal into a square wave with an amplitude proportional to the amplitude of the direct current, comprising a transformer with a primary and two secondaries, a pair of zenar diodes connected in series back to back across the primary of said transformer, an alternating current voltage supply connected to the primary of said transformer, a second pair of diodes connected in series across the first secondary of said transformer, a third pair of diodes connected in series and the combination connected in parallel with said second pair of diodes, a fourth pair of diodes connected in series across the second secondary of said transformer, a fifth pair of diodes connected in series and the combination connected in parallel with the fourth pair of diodes, an input signal of direct current connected to the junction points between the second and fourth pairs of diodes, a first output terminal connected to the junction point between said third pair of diodes, a second output terminal connected to the junction point between the fifth pair of diodes, and a pair of resistors connected between the output terminals and their junction point connected to a ground plane.

References Cited in the file of this patent

UNITED STATES PATENTS

| | | |
|---|---|---|
| 2,833,980 | Hedgcock et al. | May 6, 1958 |
| 2,843,745 | Smith | July 15, 1958 |